Nov. 10, 1959 W. K. GANNETT ET AL 2,911,837
MOTION TRANSMITTING MECHANISM
Filed April 13, 1959 2 Sheets-Sheet 1

INVENTORS
WRIGHT K. GANNETT
HAROLD H. WIESE
BY

United States Patent Office 2,911,837
Patented Nov. 10, 1959

2,911,837

MOTION TRANSMITTING MECHANISM

Wright K. Gannett and Harold H. Wiese, Davenport, Iowa, assignors to the United States of America as represented by the Secretary of the Army Application April 13, 1959, Serial No. 806,199

5 Claims. (Cl. 74—110)

The present invention relates to a motion transmitting mechanism and more particularly to an arrangement which will transmit a mechanical movement through a plurality of members which are mounted for rotation relative to each other.

Although the problem of transferring reciprocating movement as between opposite sides of two or more rotatable members has been accomplished by means of a flexible push-pull cable type of system, it frequently occurs that a more positive or rigid type of control is essential. A requirement of this kind is found, for example, in ordnance items where the gun is mounted on a base for orientation in different attitudes of elevation with respect to the base. In apparatus of this kind, it is found expedient to mount the operator's trigger on a portion of the base and provide a linkage which will effect trigger action at a remote point at the gun regardless of the gun attitude.

Therefore, it is a primary object of the present invention to provide a motion transmitting mechanism that will enable a positive connection for transferring reciprocating movement as between two or more members which are mounted for rotation relative to each other.

Another object of the present invention is to provide a system of levers which will effect transfer of reciprocatory movement through two members without being affected by rotation as between those members.

Still another object of the present invention is to provide a positive system of motion transfer which is particularly suitable as a trigger system for items of ordnance and provide a more rigid type of control.

A further object of the present invention is to provide a mechanism which will enable mechanical motion to be transmitted through at least two parts which are mounted for rotation relative to each other without the parts or the mechanism interfering with the operation of each other.

Still further it is an object of the present invention to provide a reciprocatory system for transfer of lineal movement through two or more rotatable members which is adaptable to effect a push or pull action.

It is also an object of the present invention to provide a motion transfer system which is comparatively simple in construction, highly efficient and reliable in operation.

In accordance with the above objects, the present invention comprises a transfer member which extends axially through a hollow bearing on which two members are mounted for independent rotation. A pair of bell crank levers mounted respectively on the rotatable members have respective arms thereof in pivotal contact with opposite ends of the transfer member. The other arms of the levers are adapted for connection with motion producing and motion receiving members carried respectively by the rotatable members whereby reciprocating movement can be effected on opposite sides of the two members to effect either a push or pull action regardless of their movement by rotation.

The foregoing and other objects of the present invention will become apparent from the following description and the accompanying drawings which explain and illustrate two embodiments thereof and wherein.

Figure 2:
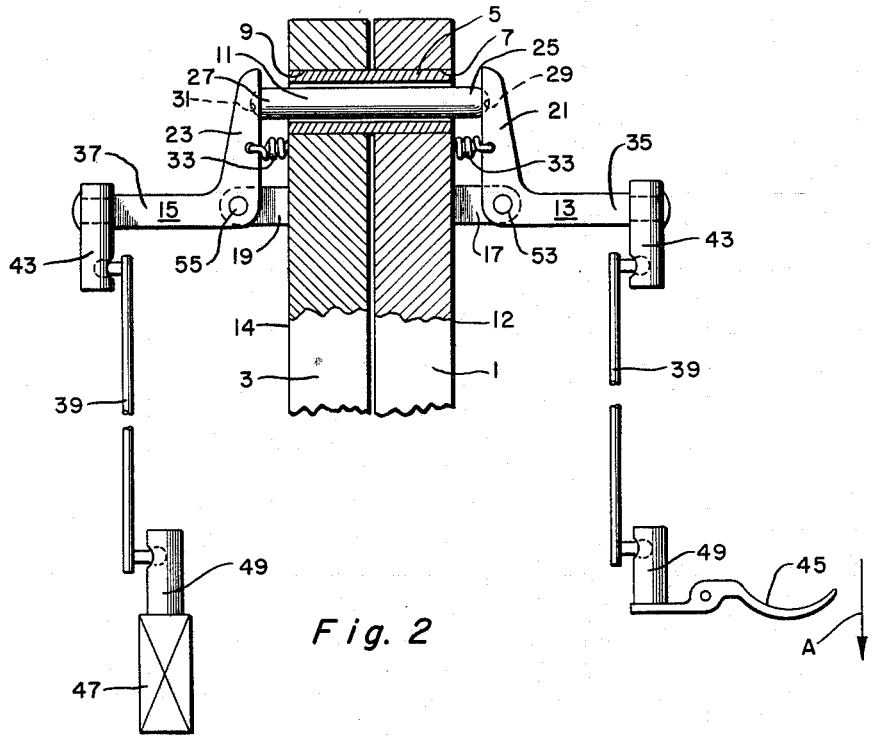
Figure 2 is an enlarged view, partly in elevation and partly in section, of the mechanism shown in Figure 1.
Figure 1:
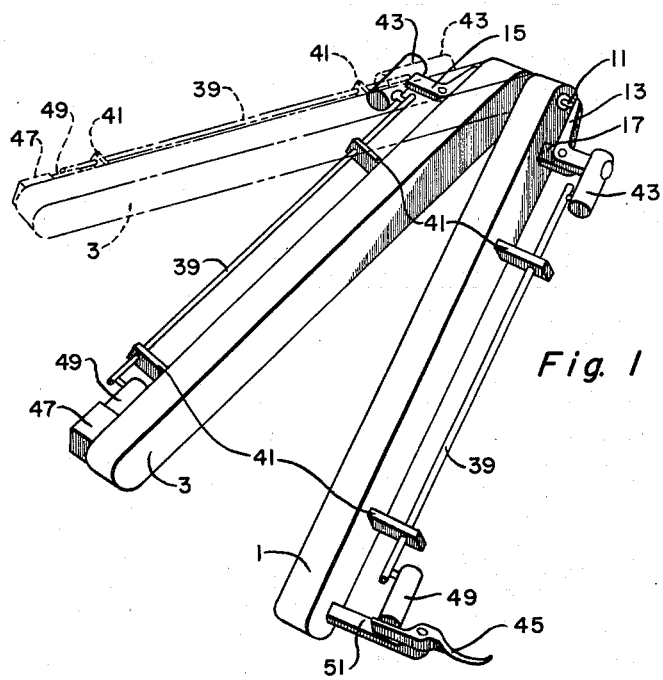
Figure 1 is a perspective view of a push type motion transmitting mechanism in accordance with the present invention, as applied to a pair of members mounted for rotation, and showing one of the members, in phantom, disposed in a secondary position relative to the other member.

Referring more particularly to the drawings, wherein similar reference numerals have been used to designate corresponding parts throughout, the present invention is shown in Figures 1 and 2 as a first embodiment comprising a push type mechanism. In this arrangement, a pair of members 1, 3 may be conceived as representing a portion of the frame or base of a gun mount, and a portion of a gun cradle or gun carriage supported thereon for orientation in various attitudes of elevation. In either embodiment, it is understandable that the base and gun carriage are mounted for rotation relative to each other in a manner similar to that shown in Figure 1 of the drawings which illustrates two positions of the base member 1 relative to the gun member 3.

In both embodiments, the two members 1, 3 are mounted for rotation about a common axis provided by a hollow cylindrical bearing 5 which is disposed through apertures 7, 9 in the respective members. A force transmitting member or transfer pin 11, 11' is disposed in the hollow interior of the bearing. The pin is at least coextensive with the bearing, that it, it extends beyond the far sides 12, 14 of the members, and it is freely slidable axially therethrough. Mounted on each member is a bell crank lever 13, 15, 14, 16. The levers are pivotally mounted in any convenient manner, such as by the supports 17, 19 carried by the members, and are disposed so that an arm 21, 23, 22, 24 of each lever has the free end thereof contacting respective opposite ends 25, 27, 25', 27' of the transfer pin 11, 11'. The ends of the transfer pin are rounded complementary with spherical depressions 29, 31, 30, 32 provided in the free end of the lever arm. In this manner, the lever arm is freely rotatable relative to the transfer pin. A coil spring 33, 33' is attached between each member and the lever arm in a manner to maintain the lever arm engaged with the transfer pin.

The other arms 35, 37, 36, 38 of the bell crank levers are adapted for connection with motion producing and motion receiving parts. In the first embodiment illustrated in Figures 1 and 2, these parts comprise a pair of rods 39 supported respectively by brackets 41 for longitudinal sliding movement. The rods are connected with each lever arm by any suitable means which will permit freedom of movement of the parts and, at the same time, transfer motion between the rods and levers, such as the ball joints 43. On one side of the members 1, 3 the rod is connected with a trigger 45 and on the other side the rod is connected with a triggering mechanism 47. Ball joints 49 are provided as connections between the rods and the trigger and trigger mechanism. In addition, the trigger 45 is pivotally mounted on the member 1 by a suitable support 51 and the trigger mechanism is mounted on the other member 3 by any suitable means.

In accordance with this structural arrangement, the mechanical system will be found to operate in the following manner. Upon actuating the trigger 45, in the direction of the arrow A in Figure 2, pushing movement is transferred by the ball joint 49 connected therewith to the rod 39. In turn, longitudinal movement is transferred by ball joint 43 to bell crank lever 13. Lever 13 is caused to rotate counterclockwise on its pivotal connection 53 with the result that its arm 21 will impart longitudinal pushing movement to transfer pin 11. Pin 11 will influence arm 23 of bell crank lever 15 to move counterclockwise and rotate that lever on its pivotal connection 55. Arm 37 of the lever 15 will produce pushing movement of the ball joint 43 connected therewith and impart longitudinal pushing movement to rod 39 and ball joint 49 associated with member 3 to operate the trigger mechanism 47.

Figure 3:
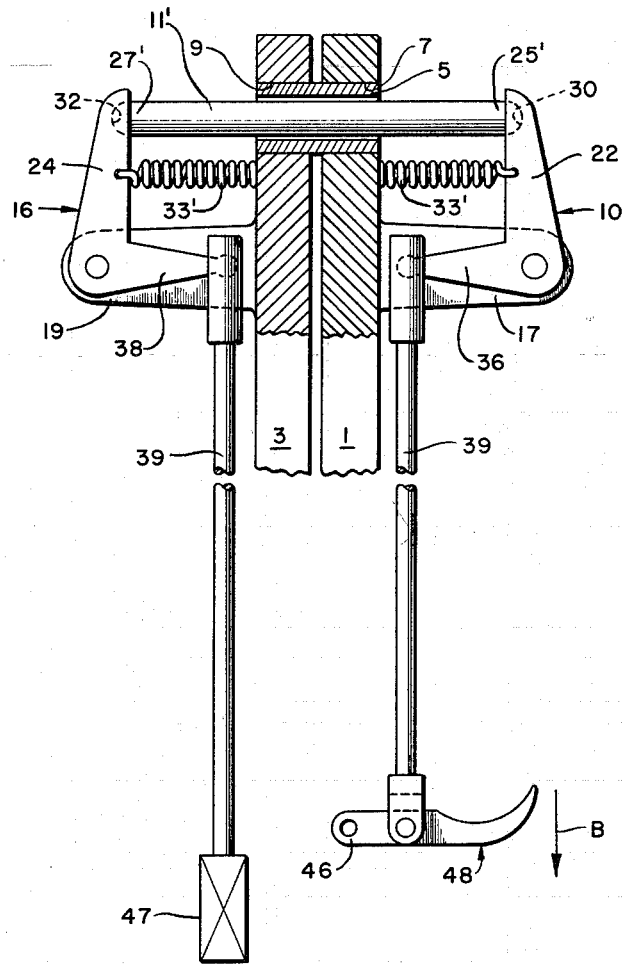
Figure 3 is a view, similar to Figure 2, of a pull type motion transmitting mechanism in accordance with the present invention.

In the second embodiment, shown in Figure 3, the rods 39 are adapted for being supported in a manner similar to that shown in Figure 1. The difference between the two embodiments is essentially in the arrangement of the bell crank levers. In the second embodiment, the levers 10, 16 are supported for rotation in a manner similar to the first embodiment except that they are disposed for rotation in an opposite direction. The trigger connection to the rod 39 is so disposed as to effect a pulling movement by an operator. This is accomplished by having an end 46 pivotally connected to a support and connecting the rod 39 interjacent the ends. The connections between the respective parts, as by ball joints, and the arrangement of parts is the same.

The mechanical system of this pull type arrangement will be found to operate as follows. Actuation of the trigger 48, in the direction of the arrow B in Figure 3, effects a pull upon the rod 39 to which it is connected. In turn, the bell crank lever 10 is rotated counterclockwise about its pivotal connection with the result that it causes the transfer pin 11' to move to the left, as viewed in Figure 3. The transfer pin will influence the bell crank lever 16 to move counterclockwise and arm 38 of that lever will effect a pull upon rod 39 to which it is connected. A pull on the rod will, in turn, effect a pull on the trigger mechanism 47.

It will be recognized that the pivotal engagement of the bell crank lever with the transfer pin in both embodiments permits the trigger mechanism to function independently of relative movement as between the members it is associated with. In other words, the arrangement provides a positive connection between the operator's trigger and gun regardless of the gun attitude. Although there is shown and described herein but two embodiments of the present invention, it will be recognized by persons skilled in the art that the arrangement will be found to possess considerable merit from the standpoint of efficiency and is susceptible to other situations. In addition thereto, it will also be recognized that modifications and changes are possible within the spirit of the present invention. Therefore, it is desired that the particular forms of the invention presented herein be considered as illustrative and not as limiting.

What is claimed is:

1. In a mechanical movement, two members mounted for rotation relative to each other about a common axis, operating means carried by one of said members and mounted for movement in radial directions, a first bell crank lever pivotally mounted on said one member having one arm thereof connected with said operating means, a transfer pin mounted for slidable movement along said common axis and extending beyond the far sides of said members, a second bell crank lever pivotally mounted on the other one of said members, the other arm of said first lever and one arm of said second lever being in pivotal contact with respective ends of said transfer pin, and means connected with the other arm of said second lever for transmitting movement initiated by said operating means.

2. In a force transmitting system, the combination with a pair of members mounted for rotation relative to each other about a common axis, of first means operatively carried by one of said members for reciprocating movement, second means carried by the other one of said members for reciprocating movement responsive to said first means, a transfer pin disposed for slidable movement relative to and through said members along said common axis, and a bell crank lever carried by each one of said members, opposite ends of said pin respectively rotatably engaging an arm of said levers, the other arm of said levers being operatively connected with said first means and said second means respectively whereby movement of said second means is effected in response to movement of said first means regardless of the relative positions of said members.

3. In a force transmitting system, means for transferring reciprocating movement from one side of two members mounted for rotation about a common axis to the opposite side of said members comprising a transfer pin of a length at least coextensive with the far sides of said members and being slidable longitudinally through said members along their common axes, and a pair of bell crank levers mounted respectively on said members far sides, an arm of each said lever rotatably engaging respectively opposite ends of said transfer pin.

4. In combination, a hollow shaft, a pair of members mounted for rotation relative to each other on said shaft in spaced apart relation, a bell crank lever pivotally mounted on opposite sides of each said member and a transfer member slidably mounted within said shaft and extending beyond the ends thereof, an arm of each said lever being pivotally engaged with oppositely disposed ends of said transfer member, the other arm of each said lever being adapted for connection respectively with a member for initiating reciprocating movement and a member for receiving reciprocating movement.

5. The invention as defined in claim 4 and wherein biasing means is connected operatively with at least one of said levers for influencing said lever to return to a normal predetermined position.

No references cited.